United States Patent
Lavi et al.

(10) Patent No.: US 11,605,386 B2
(45) Date of Patent: Mar. 14, 2023

(54) COMPUTERIZED DIALOG SYSTEM IMPROVEMENTS BASED ON CONVERSATION DATA

(71) Applicant: International Business Machines Corporation, Armonk, NY (US)

(72) Inventors: Ofer Lavi, Tel Aviv (IL); Alon Jacovi, Givatayim (IL); David Amid, Modiin (IL); David Boaz, Bahan (IL); Inbal Ronen, Haifa (IL); Ateret Anaby Tavor, Givat Ada (IL); Ori Bar El, Gan Haim (IL)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 17/000,397

(22) Filed: Aug. 24, 2020

(65) Prior Publication Data
US 2022/0059097 A1    Feb. 24, 2022

(51) Int. Cl.
    *G10L 15/30*    (2013.01)
    *G10L 15/197*   (2013.01)
    *G10L 15/32*    (2013.01)

(52) U.S. Cl.
    CPC ............ *G10L 15/30* (2013.01); *G10L 15/197* (2013.01); *G10L 15/32* (2013.01)

(58) Field of Classification Search
    CPC ....... G10L 15/30; G10L 15/197; G10L 15/32; G06F 40/35; H04L 51/02
    USPC .......................................................... 704/9
    See application file for complete search history.

(56) References Cited

U.S. PATENT DOCUMENTS

| | | | |
|---|---|---|---|
| 6,631,351 B1 * | 10/2003 | Ramachandran | G10L 13/00 704/270.1 |
| 8,275,117 B2 | 9/2012 | Huet | |
| 8,892,419 B2 * | 11/2014 | Lundberg | G06F 16/972 704/8 |
| 9,559,993 B2 | 1/2017 | Palakovich | |
| 10,395,641 B2 * | 8/2019 | Dhoolia | G10L 15/01 |
| 10,424,302 B2 * | 9/2019 | Shah | H04L 51/02 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Thuykhanh Le
(74) *Attorney, Agent, or Firm* — Michael A. Petrocelli

(57) ABSTRACT

The computer receives a group of conversation data associated with the escalation node, identifies agent responses in the conversation data, and clusters them into agent response types. The computer identifies dialog state feature value sets for the conversations. The computer identifies feature value set associations with response types, and generates, Boolean expressions representing the feature value sets associated with each of the response types. The computer makes a recommendation to add to at least one child node for the escalation node, with the child node corresponding to one of the response types. The child node has, as an entry condition, the Boolean expression for the response type to which the child node corresponds. The child node has as an action, which according to some aspects, provides a response representative of the cluster of agent responses for the response type to which the child node corresponds.

20 Claims, 8 Drawing Sheets

(56) References Cited

U.S. PATENT DOCUMENTS

| | | | | |
|---|---|---|---|---|
| 10,534,862 B2* | 1/2020 | Canim | ............... | G06F 40/30 |
| 2005/0154591 A1* | 7/2005 | Lecoeuche | ............ | G10L 15/30 |
| | | | | 704/E15.047 |
| 2009/0076798 A1* | 3/2009 | Oh | ................. | G10L 15/1815 |
| | | | | 704/9 |
| 2011/0238408 A1* | 9/2011 | Larcheveque | ........ | G06F 40/211 |
| | | | | 704/9 |
| 2011/0238409 A1* | 9/2011 | Larcheveque | ...... | G10L 15/1815 |
| | | | | 704/239 |
| 2011/0238410 A1* | 9/2011 | Larcheveque | ......... | G06F 40/30 |
| | | | | 704/9 |
| 2014/0365209 A1* | 12/2014 | Evermann | ............. | G06F 40/35 |
| | | | | 704/9 |
| 2017/0048170 A1* | 2/2017 | Smullen | ................ | H04L 67/02 |
| 2018/0054523 A1 | 2/2018 | Zhang | | |
| 2019/0268288 A1* | 8/2019 | Chandra | ................. | G06F 9/541 |
| 2019/0325868 A1* | 10/2019 | Lecue | .................... | G10L 25/63 |
| 2019/0332647 A1* | 10/2019 | Rincon Opden Bosch | ............... | |
| | | | | G06F 40/14 |
| 2019/0377790 A1 | 12/2019 | Redmond | | |
| 2020/0014604 A1* | 1/2020 | Smith | ................... | H04L 67/02 |
| 2020/0342462 A1* | 10/2020 | Todd | ..................... | G06F 40/211 |
| 2021/0303801 A1* | 9/2021 | Dua | ......................... | G06F 3/16 |
| 2022/0043973 A1* | 2/2022 | Arroyo | ............... | G06F 40/237 |
| 2022/0351731 A1* | 11/2022 | Chen | ...................... | G10L 15/22 |

OTHER PUBLICATIONS

Zhang, et al., "Network Representation Learning: A Survey", IEEE Transactions on Big Data, vol. 6, No. 1, Jan.-Mar. 2020, pp. 3-28, <https://ieeexplore.ieee.org/document/8395024>.

* cited by examiner

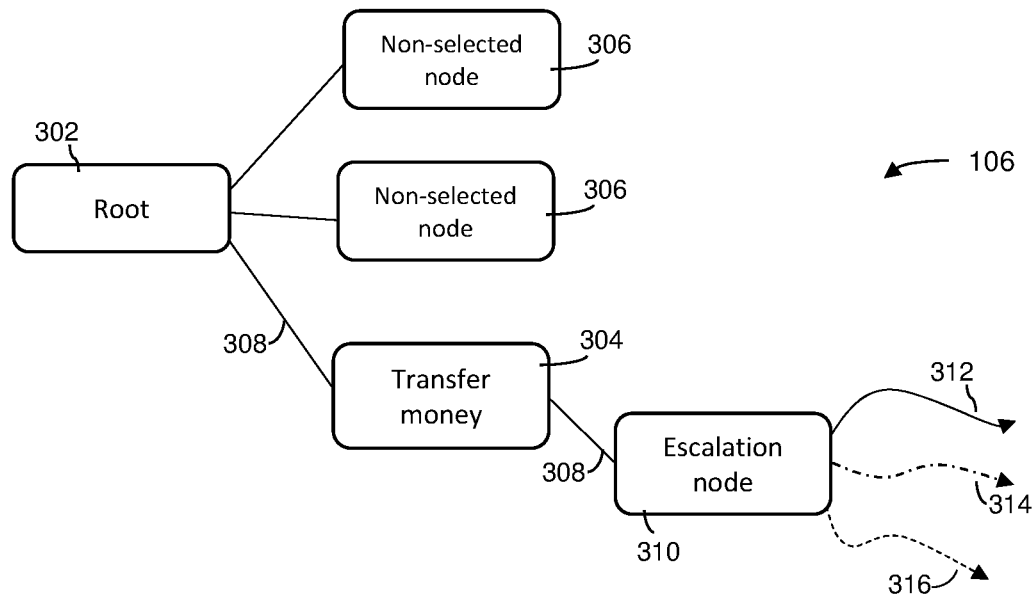

FIG. 3

| Conversation ID (402) | Agent Response (from Conversation Data) (110) | Response Type (Cluster ID) (404) |
|---|---|---|
| 1 | Message: "Please enter PIN." | 1 |
| 2 | Message: "Please provide your PIN." | 1 |
| 3 | Message: "Enter your Pin and answer this security question. Thank you for your business." | 2 |
| 4 | Message: "Please enter you Pin and answer this security question. Thank you for your business." | 2 |
| 5 | Message: "Provide your Pin and answer a security question. Thank you for your business." | 2 |
| 6 | Message: "Please provide your Pin and answer this security question." | 3 |
| 7 | Message: "Please enter your Pin and answer this security question." | 3 |
| 8 | Message: "Provide your Pin and answer this security question." | 3 |

FIG. 4  — 400

| 402 | 502 | 504 | 506 | 508 | 404 |
|---|---|---|---|---|---|
| Conversation ID | Account # | User Intent | VIP Status | Payment Amount | Associated Response Type (Cluster ID) |
| 1 | 92766 | Transfer Money | Yes | 350 | 1 |
| 2 | 73866 | Transfer Money | No | 600 | 1 |
| 3 | 37298 | Transfer Money | Yes | 2000 | 2 |
| 4 | 37298 | Transfer Money | Yes | 2500 | 2 |
| 5 | 57632 | Transfer Money | Yes | 4500 | 2 |
| 6 | 51122 | Transfer Money | No | 1500 | 3 |
| 7 | 92766 | Transfer Money | No | 2000 | 3 |
| 8 | 16221 | Transfer Money | No | 1500 | 3 |

FIG. 5 — 500

| 404 | 602 | 604 |
|---|---|---|
| Response Type (Cluster ID) | Boolean Expression of Dialog State at Escalation Node | Boolean Expression ID |
| 1 | Payment amount < 1500 | 1 |
| 2 | Payment amount > 1500 and Customer is VIP | 2 |
| 3 | Payment amount > 1500 and Customer is not VIP | 3 |

FIG. 6 — 600

| ID of New Node | Associated Response Type (Cluster ID) | Node Entry Condition | Node Action |
|---|---|---|---|
| 1 | 1 | Boolean condition #1 | Message: "Please enter your PIN." |
| 2 | 2 | Boolean condition #2 | Message: "Enter your Pin and answer this security question. Thank you for your business." |
| 3 | 3 | Boolean condition #3 | Message: "Provide your Pin and answer this security question." |

COMPUTERIZED DIALOG SYSTEM IMPROVEMENTS BASED ON CONVERSATION DATA

BACKGROUND

The present invention relates generally to the field of computer driven, interactive dialog systems, and more specifically, to systems that transition from automatic interaction to human agent interaction when the system is unable to assist a user automatically.

Automated dialog systems, also known as chatbots, are computer-driven systems that interact with users through natural language processing. Certain dialog systems (e.g., task oriented systems) are designed to help users efficiently accomplish certain goals. These task oriented systems determine user goals by parsing input and then provide appropriate responses. The system analyzes user input to understand the user's intended goal and then provides a response (e.g., give replies, trigger actions, and so forth) designed to accomplish that goal. When a dialog system is either unable to determine a user's goal or has not been trained to reach the user's goal, automated communication with the user stops; in some systems, the interaction is then escalated to a human agent for further interaction.

SUMMARY

According to one embodiment, a computer-implemented method to modify a dialog system execution graph, includes receiving, by the computer, an execution graph that includes an escalation node. The computer receives conversation data for conversations associated with the escalation node. The computer identifies agent responses in those conversations and clusters them into agent response types. The computer determines dialog state feature value sets for the conversations at the escalation node. The computer identifies feature value set associations with the response types, and generates, for each response type, a Boolean expression representing the associated feature value sets. The computer makes a recommendation, to add to the execution graph at least one child node for the escalation node, with the child node corresponding to one of the response types. The child node has, as an entry condition, the Boolean expression for the response type to which the child node corresponds and an action. According to aspects of the invention, the child node action, is representative of a response in the cluster of agent responses for the response type to which the child node corresponds. According to aspects of the invention, the method further includes inserting the child node into the execution graph at said escalation node. According to aspects of the invention, the clustering is accomplished, at least in part, by a mean shift clustering algorithm. According to aspects of the invention, the clusters are based, at least in part, on semantic similarity. According to aspects of the invention, an algorithm to classify the feature value sets is selected from a list consisting of a decision tree, random forest, & XGBoost. According to aspects of the invention, the computer ranks the recommended child nodes according to associated response type cluster size (or other child node feature selected by one skilled in this field) and selects a predetermined number (e.g., such as three, or other number determined in accordance with the judgment of one skilled in this field) of top-ranked child nodes.

According to another embodiment a system to modify a dialog system execution graph comprises: a computer system comprising a computer readable storage medium having program instructions embodied therewith, the program instructions executable by a computer to cause the computer to: receive an execution graph including an escalation node; receive conversation data for conversations associated with said escalation node; identify agent responses in said conversation data and clustering said agent responses into response types; determine dialog state feature value sets for said conversations at said escalation node; identify feature value set associations with said response types; generate, for each response type, a Boolean expression representing the associated feature value sets; and make a recommendation to add to said execution graph at least one child node for said escalation node, said child node corresponding to one of said response types, wherein said at least one child node has, as an entry condition, the Boolean expression for the response type to which the child node corresponds, and wherein said child node has, as an action, further instructing said computer to providing a response.

According to another embodiment a computer program product to modify a dialog system execution graph, the computer program product comprising a computer readable storage medium having program instructions embodied therewith, the program instructions executable by a computer to cause the computer to: receive, using said computer, an execution graph including an escalation node; receive, using said computer, conversation data for conversations associated with said escalation node; identify, using said computer, agent responses in said conversation data and clustering said agent responses into response types; determine, using said computer, dialog state feature value sets for said conversations at said escalation node; identify, using said computer, feature value set associations with said response types; generate, using said computer, for each response type, a Boolean expression representing the associated feature value sets; and make a recommendation, using said computer, to add to said execution graph at least one child node for said escalation node, said child node corresponding to one of said response types, wherein said at least one child node has, as an entry condition, the Boolean expression for the response type to which the child node corresponds, and wherein said child node has, as an action, further causing said computer to providing a response.

The present disclosure recognizes the shortcomings and problems associated with dialog systems that need to operate effectively in settings with scopes of coverage the change and which require ongoing improvements to maintain relevance and current topical coverage.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 3 is a schematic block diagram illustrating aspects of a dialog system execution graph including an escalation node and several clusters of response types provided at the escalation node, according to embodiments of the present invention.

FIG. 4 is a table showing selected details about the clusters of response types shown schematically in FIG. 3, wherein each row indicates the agent response provided in a conversation with a user and corresponding response type.

FIG. 5 is a table showing representative selected feature values of conversations at the escalation node shown schematically in FIG. 3, with each row corresponding to a separate conversation and indicating the response type cluster associated with the conversation.

FIG. 6 is a table showing selected details about Boolean expressions representing the dialog state of conversations passing through the noted escalation node shown schematically in FIG. 3.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
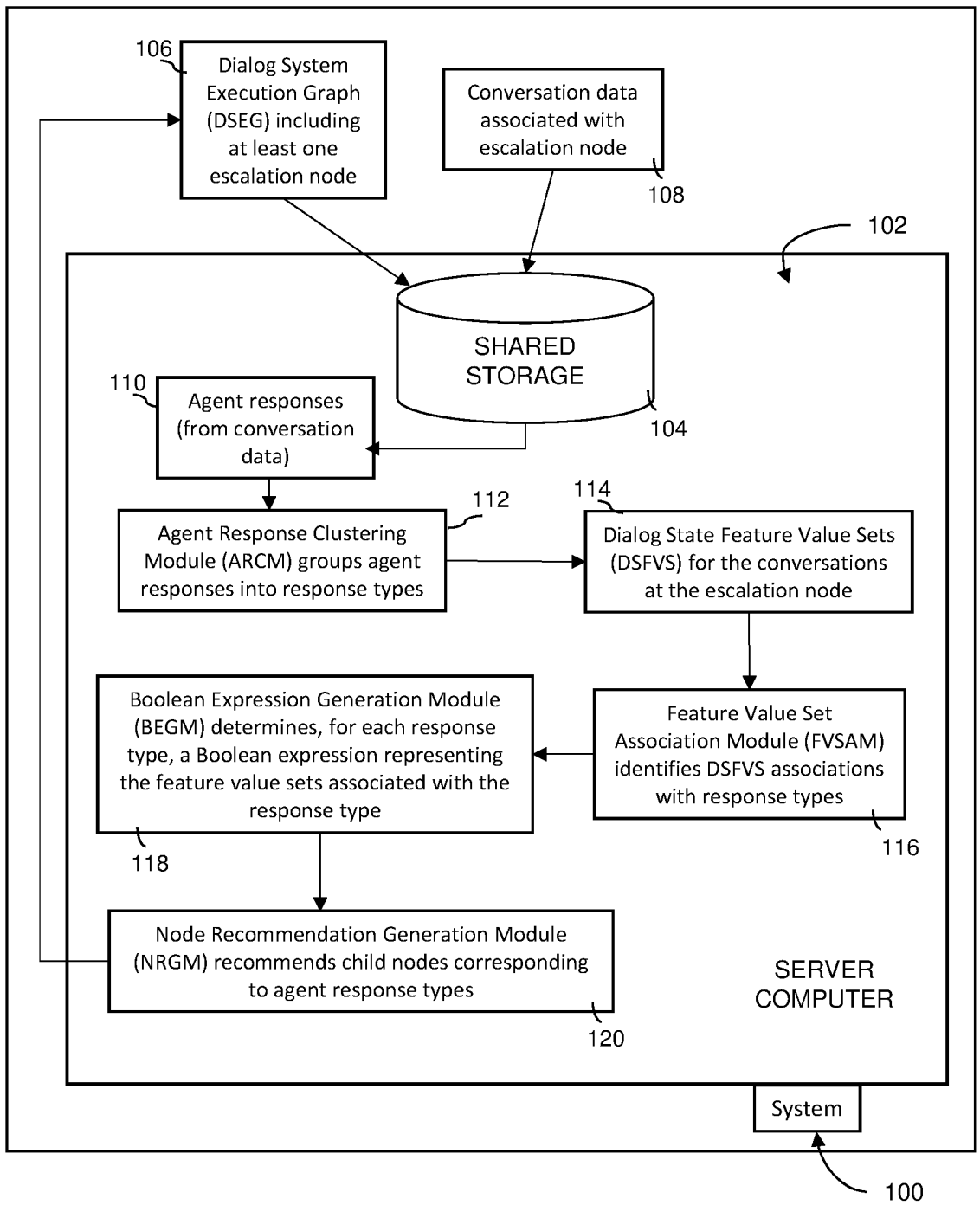
FIG. 1 is a schematic block diagram illustrating an overview of a system for computer-implemented, automatic improvement of a deployed dialog system, according to embodiments of the present invention.
Figure 2:
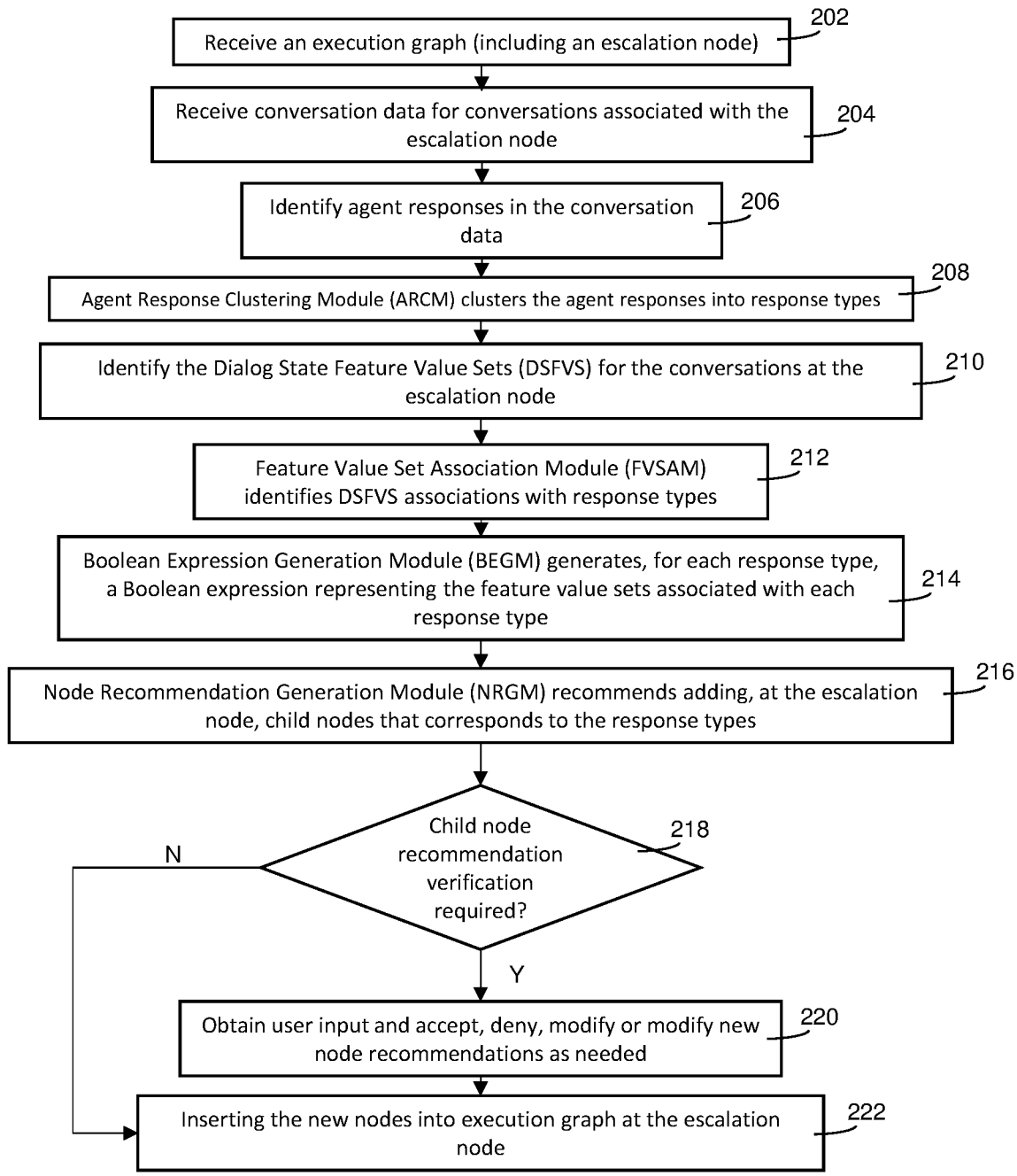
FIG. 2 is a flowchart illustrating a method, implemented using the system shown in FIG. 1, of automatically improving a deployed dialog system according to aspects of the invention.

Now with combined reference to the Figures generally and with particular reference to FIG. 1 and FIG. 2, an overview of a method for automatically modifying a deployed Dialog System Execution Graph (DSEG) 106 usable within system 100, as carried out by a server computer 102 having optionally shared storage 104 and aspects that learn appropriate conversation escalation node responses from associated conversation data 108 and add, at escalation nodes (described more fully below), new children nodes (also discussed below) that provide historically-appropriate responses when re-encountering previously-encountered conversation failure points.

Figures 7, 8:
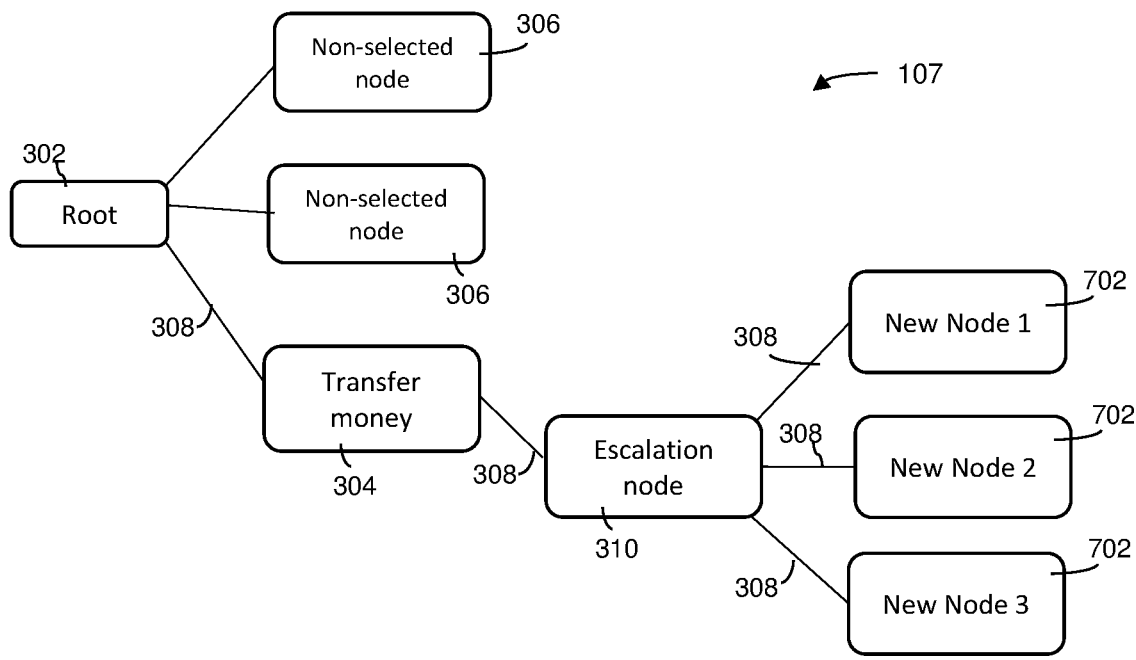
FIG. 7 is a schematic block diagram illustrating aspects of the dialog system shown in FIG. 3 further including new nodes added as children to the escalation node according to embodiments of the present invention.
FIG. 8 is a table showing selected details about the new nodes shown in FIG. 7, including node entry conditions and node actions.

The sever computer 102 is in communication with a dialog system execution graph 106 that includes at least one escalation node 310 (shown in more clearly in FIG. 3 and FIG. 7) and a source of conversation data 108 that show how a human agent and a user interacted after automated user interaction reached a conversation failure point, as represented by escalation node 310 (shown, for example, in FIG. 3 and FIG. 7). The server computer 102 collects agent responses 110 from conversation data associated with the escalation node 108 and groups, via an Agent Response Clustering Module (ARCM) 112, the agent responses into response types or clusters 404 (shown, for example, in FIG. 4). The server computer 102 identifies Dialog State Feature Value Sets (DSFVS) 114 from each conversation at the escalation node 310. Each DSFVS 114 contains information that describes the interaction between the user and automated system up to the point the associated conversation was escalated to the human agent. The server computer 102 includes a Feature Value Set Association Module (FVSAM) 116 that matches DSFVS with response types groups generated by the ARCM 112. The server computer 102 includes a Boolean Expression Generation Module (BEGM) 118 that determines, for each response type, a Boolean expression 602 (shown, for example, in FIG. 6) representing the DSFVS 114 associated with the response type. The server computer 102 includes a Node Recommendation Generation Module (NRGM) 120 that recommends (as will be described more fully below) new nodes 702 (as child nodes of the escalation node 310) that correspond to the agent response types 404. According to some aspects of the invention, the server computer 102 integrates the new nodes 702 recommended by the NRGM into the DSEG 106 at the escalation node 310. According to some aspects of the invention, the recommendation of new nodes 702 may be conducted iteratively, with each new node extending the scope of coverage for the dialog system 106, allowing the dialog system to adjust (e.g., by incorporating coverage for new technology and terminology) as needed to maintain relevance over time.

Now, with additional reference to FIG. 2, aspects of a method useable within the system 100 described above to improve a deployed dialog system execution graph according to some aspects of the invention will be discussed in detail. According to aspects of an embodiment, the server computer 102 receives, at block 202, a DSEG that includes at least one an escalation node 310. The escalation node 310 is the point in a conversation 402 between a user and an automated assistant (e.g., a chatbot, chit-chat bot, etc.) failed, and the conversation was escalated to a human agent. The server computer 102 receives, at block 204, a group of conversation data 108 associated with the escalation node 310. The conversation data 108 contain details of the post-failure-node communication between the human agent and the user being assisted. At block 206, the server computer 102 identifies the agent responses 110 from within the conversation data 108, thereby gathering a set of responses appropriate for future use in conversations resembling ones that previously failed at this escalation node 310 and needed human agent intervention for successful resolution. The server computer 102 clusters agent responses 110, via the ARCM 112 in block 208, into different response types 404 (shown, for example, in FIG. 4), with possibly several escalated conversations 402 belonging to each response type. The clustering can be accomplished in a variety of manners, including the mean shift algorithm, K-means algorithm, or other suitable algorithm selected in accordance with the judgment of one skilled in this field.

The server computer 102 at block 210 identifies the Dialog State Feature Value Sets (DSFVS) 114 of the conversation data 108 present at the escalation node 310. Each DSFVS 114, characterizes the conversation state of an escalated conversation 402 at the escalation node 310 and includes the context of the conversation state at the escalation node, including various aspects of the interaction with the user before failure (e.g., for example, user intent and user account details). For each escalated conversation 402, these sets of values 114 provide details of the exchange that occurred between the automated agent and a user, before the conversation failed and was escalated for human agent intervention. Learning to replicate the human agent response, improves the DSEG 106, because the originally deployed dialog system was not able to provide this response automatically. As will be described more fully below, aspects of the present invention include learning about human agent responses and modifying the structure of the DSEG 106 to generate nodes and edges (as shown, for example, in FIG. 7) that accommodate dialog states that the originally-deployed dialog system was not equipped to handle properly. According to aspects of the invention, the modified DSEG (mDSEG) 107 includes nodes 702 specifically designed with entry conditions 308 and associated responses and other actions 802 that cooperatively replicate the diagnosis phase and subsequent response of a human agent receiving a conversation with a similar escalation node Dialog State Feature Value Set 114 (represented, for example, by rows in FIG. 5) and related Boolean expression of conversation dialog state 602 (represented, for example, in FIG. 6) as those associated with the new nodes 702.

The server computer 102 identifies, via the Feature Value Set Association Module (FVSAM) 116 at block 212, associations of the Dialog State Feature Value Sets 114 with the agent response types 404. It is noted the response types 404 represent clusters of agent responses 110 that are semantically similar. The server computer 102 generates, via the Boolean Expression Generation Module 118 at block 214, for each response type 404, a Boolean expression 602 representing the associated DSFVS 114. Examples of these expressions 602 are shown in FIG. 6, and each expression corresponds to one of the agent response types 404.

The server computer 102, recommends via the Node Recommendation Generation Module 120 at block 216, adding at the escalation node 310, new nodes 702 which, as seen with additional reference to FIG. 8, each correspond to an agent response type 404. Each new node 702 is characterized by an entry condition edge 308 that corresponds to one of the Boolean expressions 602 generated in block 214. With continued reference to FIG. 8, the new nodes are each also characterized by a node action 802 that represents an agent response 110 of the response type 404 associated with new node.

According to aspects of the invention, new nodes 702 may be added to the Dialog System Execution Graph 106 automatically, or the server computer 102 may require verification (e.g., by a dialog system execution graph designer or other source of oversight selected by one skilled in this field). The server computer 102 determines at block 218 whether verification is required. It is noted that the requirement for new node recommendation may be predetermined (e.g., set at deployment) or may be subsequently determined (e.g., with real-time user input or via some other suitable method selected by one skilled in this field.) If new node verification is not required, the new nodes 702 are accepted automatically and integrated at block 222 into the DSEG 106 at the escalation node. However, if new node verification is required, the server computer will, at block 220, obtain user input and accept, deny, modify or modify new node recommendations as needed before proceeding to block 222, to integrate new nodes into the execution graph at the escalation node 310.

With particular reference to FIG. 3, a Dialog System Execution Graph (DSEG) 106 according to aspects of the invention will now be described. The DSEG 106 includes a series of steps that show two phases of user interaction. The first phase is characterized by interaction between a user and an automated assistant (e.g., a chatbot, etc.); the second phase is characterized by interaction between a user and a human agent. The transition between the two phases is a conversation failure point represented in the DSEG 106 by an escalation node 310. A DSEG may include more than one escalation node 310, with each one representing a place in the conversation where an automated assistant was no longer able to assist the user, and the conversation was transferred to a human agent. The DSEG 106 includes a root node 302, a series of conversation nodes 304, and several non-selected nodes 306. In this example, the node edges 308 among the root and conversation nodes 302, 304 represent node entry conditions that have been satisfied. The DSEG 106 also includes schematically represented groups of agent responses clustered into response types 312, 314, 316. Although the present example shows three clusters of responses 312, 314, 316 each representing different response types, more or fewer response types may be present.

Now with particular reference to FIG. 4, an agent response table 400 shows the agent response 110 from several different conversations indexed by conversation ID 402. As shown in table 400, the eight conversations have agent responses 110 with three different response types 404 (also shown as a Cluster ID). Table 400 shows that the semantically similar responses are clustered into the same response type 404.

Now with particular reference to FIG. 5, an elevated conversation features table 500 provides details such as conversation ID 402, user account number 404, user intent 406, user status 408, a transaction payment amount 410, and a response type 404 associated with each conversation. The rows in the table 500 show Dialog State Feature Value Sets (DSFVS) 114 for each escalated conversation 402 and the response type 404 associated with each conversation 402. According to aspects of the invention a node entry decision function is learned, taking the dialogue state as input to discriminate between the clusters of response type 404. In this way, the response types provide by human agents can provide not only entry conditions for child nodes inserted at the escalation point, but also can provide model responses provided as actions of those nodes.

Now with particular reference to FIG. 6, a table 600 that contains Boolean expressions 602 of the conversation dialog state at the escalation node 310 is shown. Table 600 includes an expression ID value for each agent response type 404. According to aspects of this invention, there is a one-to-one relationship between the number of agent response types 404 and the number of Boolean expressions. It is noted that the Boolean expressions shown in table 600 may be generated by any of several known classification algorithms (e.g., decision tree, random forest, XGBoost, etc.) selected by one skilled in this field. However, the use a of decision tree is preferred, because the decision tree outputs Boolean conditions for each cluster and thus has a high degree of readability and interpretability and the results are readily interpreted by users wishing to review and approve recommended modifications to the dialog system execution graph 106.

A modified Dialog System Execution Graph (mDSEG) 107 according to aspects of the invention is shown in FIG. 7. The mDSEG 107 has the same elements as the originally deployed DSEG 106, except for new nodes 702 inserted as children of the escalation node 310. The new nodes (as shown, for example in FIG. 8) are characterized by entry conditions 308 and node actions that replicate the human agent diagnosis and response behavior reflected in conversation data for conversations having similar dialog states as those reflected by aspects of the new nodes 702. With combined reference to FIG. 6 and FIG. 8, the new nodes 702 are characterized by entry conditions 308 that correspond to one of the Boolean expressions 602 generated by the server computer at block 214.

It is noted that, according to aspects of the invention, the execution graph 107 received in block 202 may include more than one escalation node 310, and that the server computer 106 may repeat some or all of the procedures described above as needed to recommend and integrate additional new nodes 702 for additional escalation nodes 310. According to aspects of the invention, in embodiments in which more than one new node 702 is recommended, the server computer 102 ranks the recommended new nodes 702 according to associated response type cluster size (or other node feature selected by one skilled in this field) and selects a predetermined number (e.g., such as three, or other number determined in accordance with the judgment of one skilled in this field) of top-ranked nodes 702 as child nodes for the escalation node 310.

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
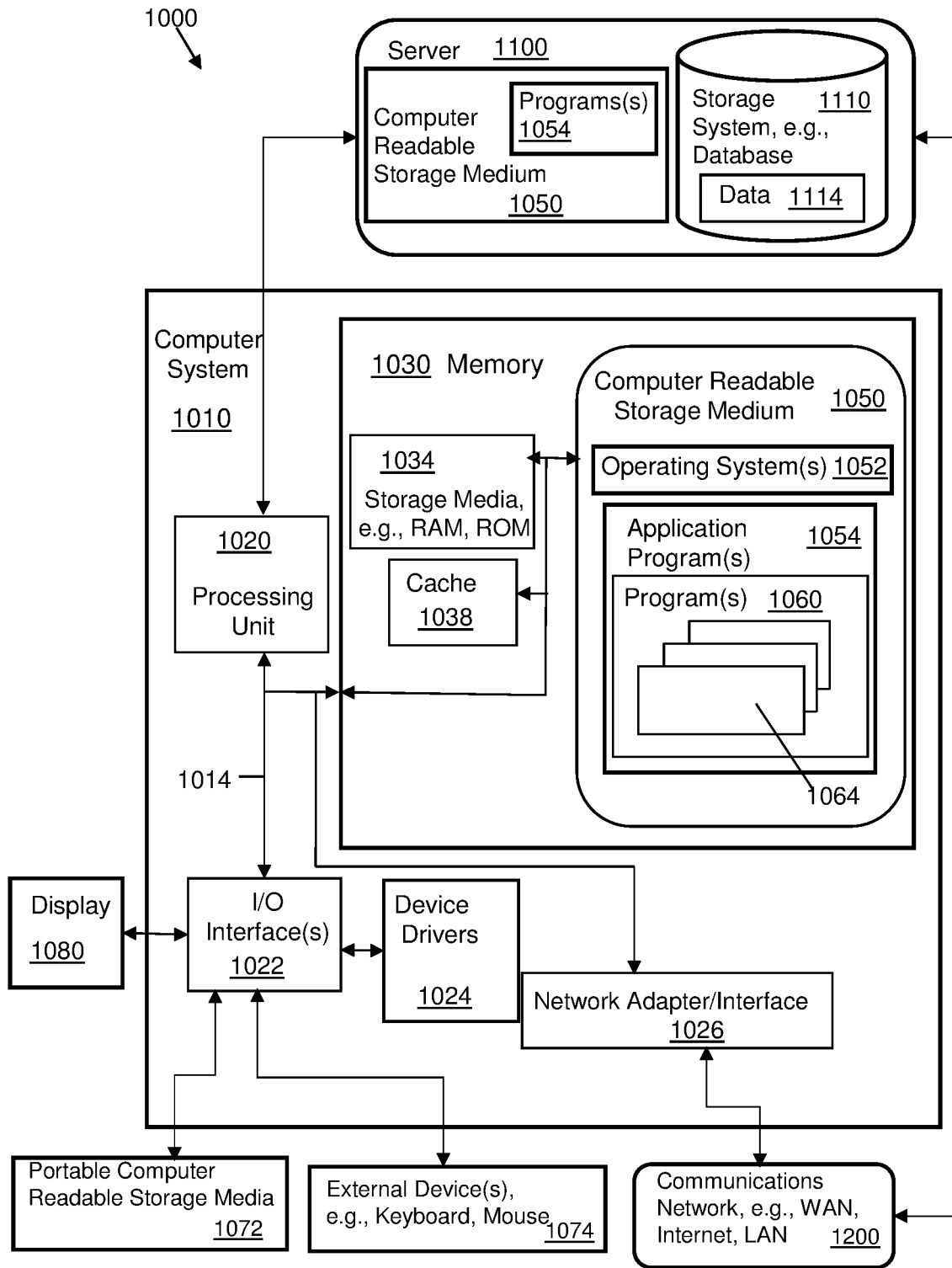
FIG. 9 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 9, a system or computer environment 1000 includes a computer diagram 1010 shown in the form of a generic computing device. The method 100, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that the control system 70 (shown in FIG. 9) can include all or part of the computer system 1010 and its components, and/or the control system can communicate with all or part of the computer system 1010 and its components as a remote computer system, to achieve the control system functions described in the present disclosure. It is also understood that the one or more communication devices 110 shown in FIG. 1 similarly can include all or part of the computer system 1010 and its components, and/or the communication devices can communicate with all or part of the computer system 1010 and its components as a remote computer system, to achieve the computer functions described in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
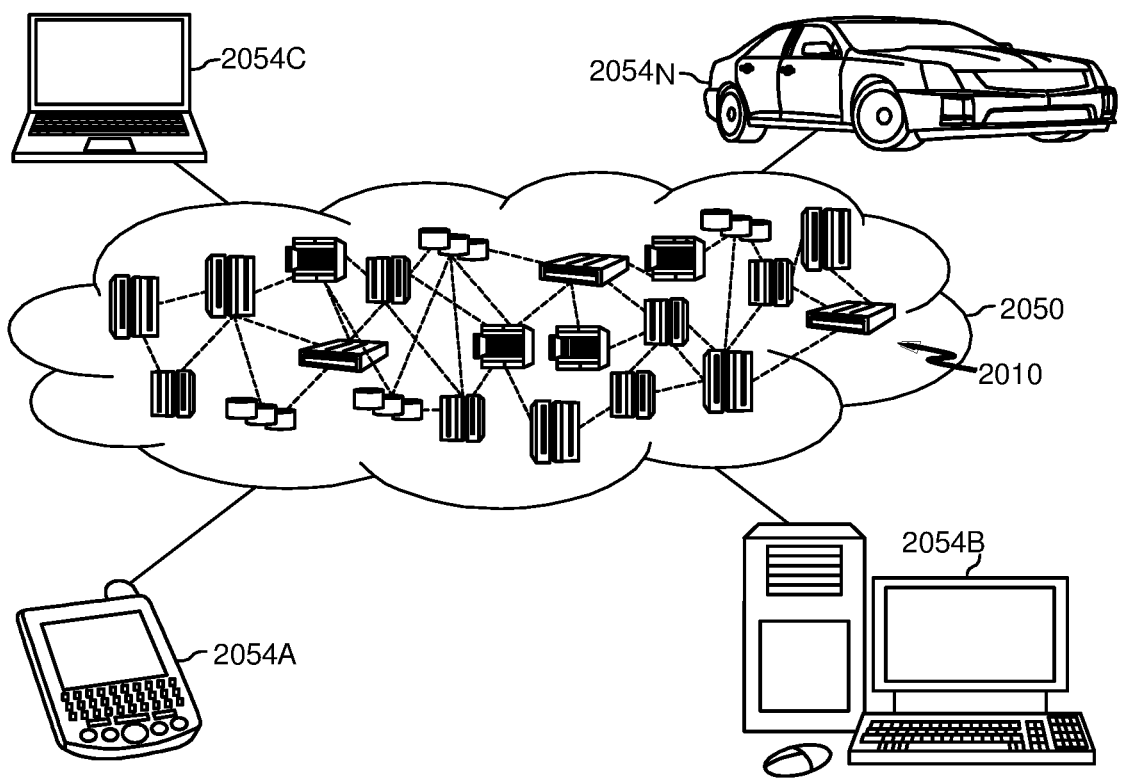
FIG. 10 depicts a cloud computing environment according to an embodiment of the present invention.

Referring now to FIG. 10, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 10 are intended to be illustrative only and that computing nodes 2010 and cloud computing environment 2050 can communicate with any type of computerized device over any type of network and/or network addressable connection (e.g., using a web browser).

Figure 11:
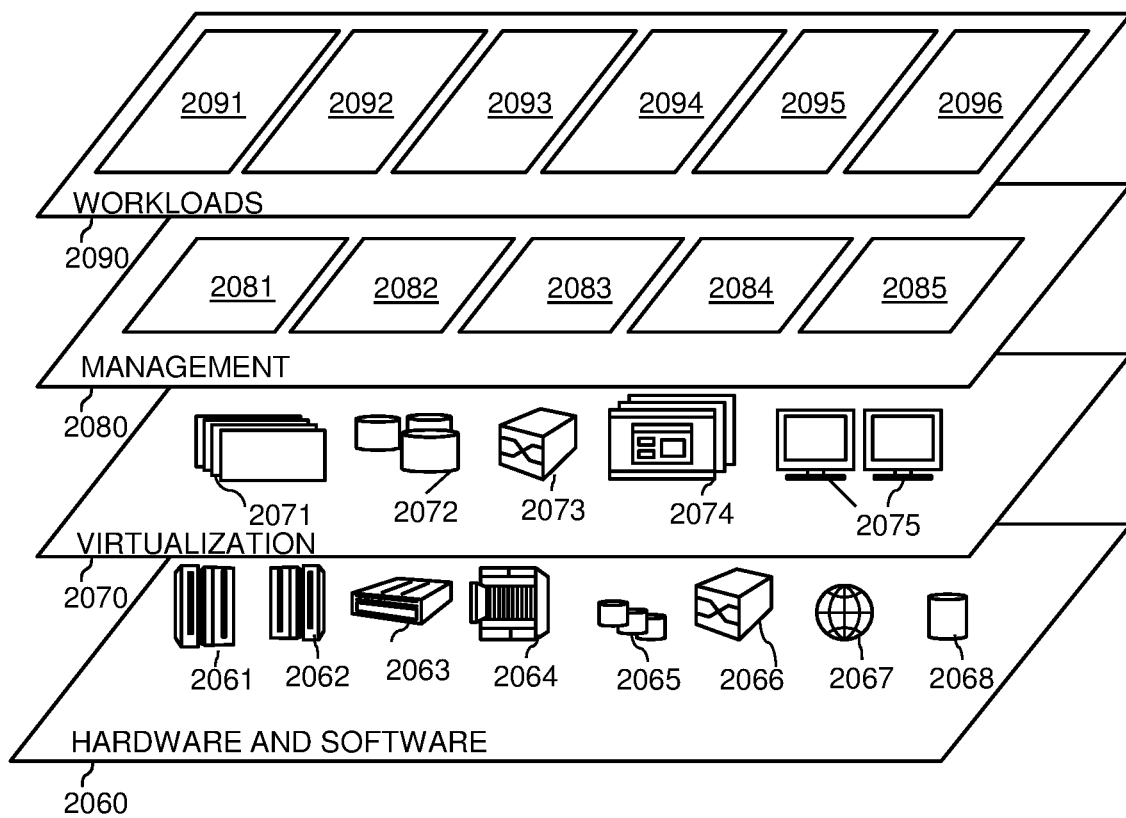
FIG. 11 depicts abstraction model layers according to an embodiment of the present invention.

Referring now to FIG. 11, a set of functional abstraction layers provided by cloud computing environment 2050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and improving deployed dialog systems 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to modify a dialog system execution graph, comprising:
    receiving, by said computer, an execution graph including an escalation node;
    receiving, by said computer, conversation data for conversations associated with said escalation node;
    identifying, by said computer, agent responses in said conversation data and clustering said agent responses into response types;
    determining, by said computer, dialog state feature value sets for said conversations at said escalation node;
    identifying, by said computer, feature value set associations with said response types;
    generating, by said computer, for each response type, a Boolean expression representing the associated feature value sets; and
    making a recommendation, by said computer, to add to said execution graph at least one child node for said escalation node, said child node corresponding to one of said response types, wherein said at least one child node has, as an entry condition, the Boolean expression for the response type to which the child node corresponds, and wherein said child node has, as an action, providing a response by said computer.

2. The method of claim 1, wherein said action is representative of a response in the cluster of agent responses for the response type to which the child node corresponds.

3. The method of claim 2, further including inserting, by said computer, into said execution graph, at said escalation node, said child node.

4. The method of claim 1, wherein said clustering is accomplished, at least in part, by a mean shift clustering algorithm.

5. The method of claim 1, wherein said clusters are based, at least in part, on semantic similarity.

6. The method of claim 1, wherein an algorithm to classify said feature value sets is selected from a list consisting of a decision tree, random forest, & XGBoost.

7. The method of claim 1, further including ranking, by said computer, the child nodes and wherein said recommendation includes selecting a predetermined number of top-ranked child nodes.

8. A system to modify a dialog system execution graph, which comprises:
    a computer system comprising a computer readable storage medium having program instructions embodied therewith, the program instructions executable by a computer to cause the computer to:
    receive an execution graph including an escalation node;
    receive conversation data for conversations associated with said escalation node;
    identify agent responses in said conversation data and clustering said agent responses into response types;
    determine dialog state feature value sets for said conversations at said escalation node;
    identify feature value set associations with said response types;
    generate, for each response type, a Boolean expression representing the associated feature value sets; and
    make a recommendation to add to said execution graph at least one child node for said escalation node, said child node corresponding to one of said response types, wherein said at least one child node has, as an entry condition, the Boolean expression for the response type to which the child node corresponds, and wherein said child node has, as an action, further instructing said computer to providing a response.

9. The system of claim 8, wherein said child node has, as an action, further causing the computer to provide a response representative of a response in the cluster of agent responses for the response type to which the child node corresponds.

10. The system of claim 9, including further instructions that cause the computer to insert, into said execution graph, at said escalation node, said child node.

11. The system of claim 8, wherein said clustering is accomplished, at least in part, by a mean shift clustering algorithm.

12. The system of claim 8, wherein said clusters are based, at least in part, on semantic similarity.

13. The system of claim 8, wherein an algorithm to identify said feature value sets is selected from a list consisting of a decision tree, random forest, & XGBoost.

14. The system of claim 8, including instructions that further cause the computer to rank the Boolean expressions and select a predetermined number of top-ranked Boolean expressions, and wherein said at least one child node includes a child node corresponding to each of said selected Boolean expressions.

15. A computer program product to modify a dialog system execution graph, the computer program product comprising a computer readable storage medium having program instructions embodied therewith, the program instructions executable by a computer to cause the computer to:
    receive, using said computer, an execution graph including an escalation node;
    receive, using said computer, conversation data for conversations associated with said escalation node;
    identify, using said computer, agent responses in said conversation data and clustering said agent responses into response types;

determine, using said computer, dialog state feature value sets for said conversations at said escalation node;

identify, using said computer, feature value set associations with said response types;

generate, using said computer, for each response type, a Boolean expression representing the associated feature value sets; and make a recommendation, using said computer, to add to said execution graph at least one child node for said escalation node, said child node corresponding to one of said response types, wherein said at least one child node has, as an entry condition, the Boolean expression for the response type to which the child node corresponds, and wherein said child node has, as an action, further causing said computer to providing a response.

16. The computer program product of claim 15, wherein said child node has, as an action, further causing the computer to provide, using said computer, a response representative of a response in the cluster of agent responses for the response type to which the child node corresponds.

17. The computer program product of claim 16, including further instructions that cause the computer to insert, using said computer, into said execution graph, at said escalation node, said child node.

18. The computer program product of claim 15, wherein said clustering is accomplished, at least in part, by a mean shift clustering algorithm.

19. The computer program product of claim 15, wherein said clusters are based, at least in part, on semantic similarity.

20. The computer program product of claim 15, wherein an algorithm to identify said feature value sets is selected from a list consisting of a decision tree, random forest, & XGBoost.

* * * * *